May 27, 1958   J. L. CIRINGIONE ET AL   2,836,060
TORSIONAL FATIGUE TESTING APPARATUS
Filed Dec. 22, 1954   7 Sheets-Sheet 1

INVENTORS.
JOSEPH L. CIRINGIONE
JULIUS INTRAUB
MARTIN O. KALB
HOWARD M. STROBEL
AARON WOLOTKIN
BY George Sipkin
Lee J. Huntzberger
ATTORNEYS May 27, 1958 J. L. CIRINGIONE ET AL 2,836,060
TORSIONAL FATIGUE TESTING APPARATUS
Filed Dec. 22, 1954 7 Sheets-Sheet 2

INVENTORS.
JOSEPH L. CIRINGIONE
JULIUS INTRAUB
MARTIN O. KALB
HOWARD M. STROBEL
AARON WOLOTKIN
BY
ATTORNEYS

May 27, 1958  J. L. CIRINGIONE ET AL  2,836,060
TORSIONAL FATIGUE TESTING APPARATUS
Filed Dec. 22, 1954  7 Sheets-Sheet 4

INVENTORS.
JOSEPH L. CIRINGIONE
JULIUS INTRAUB
MARTIN O. KALB
HOWARD M. STROBEL
AARON WOLOTKIN
BY
ATTORNEYS

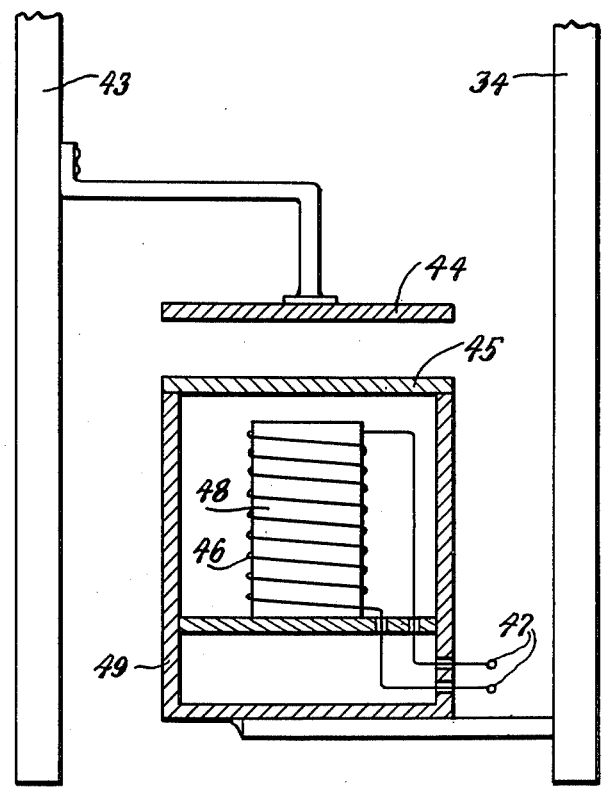

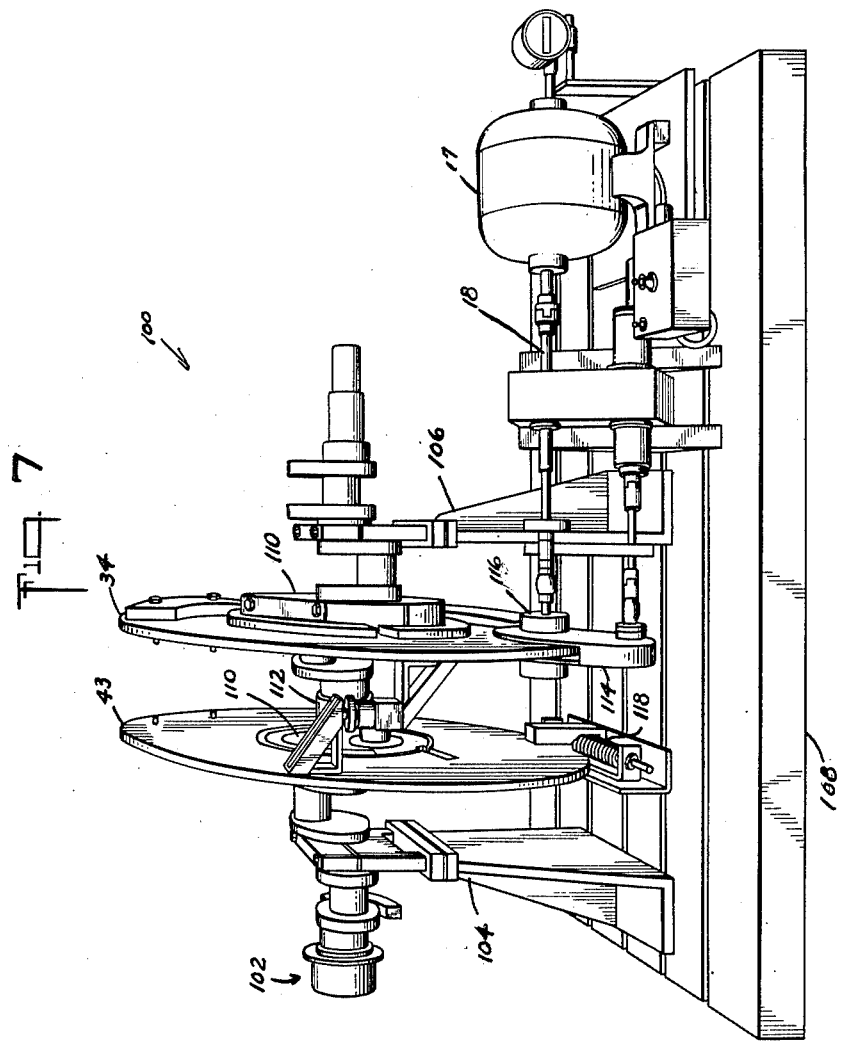

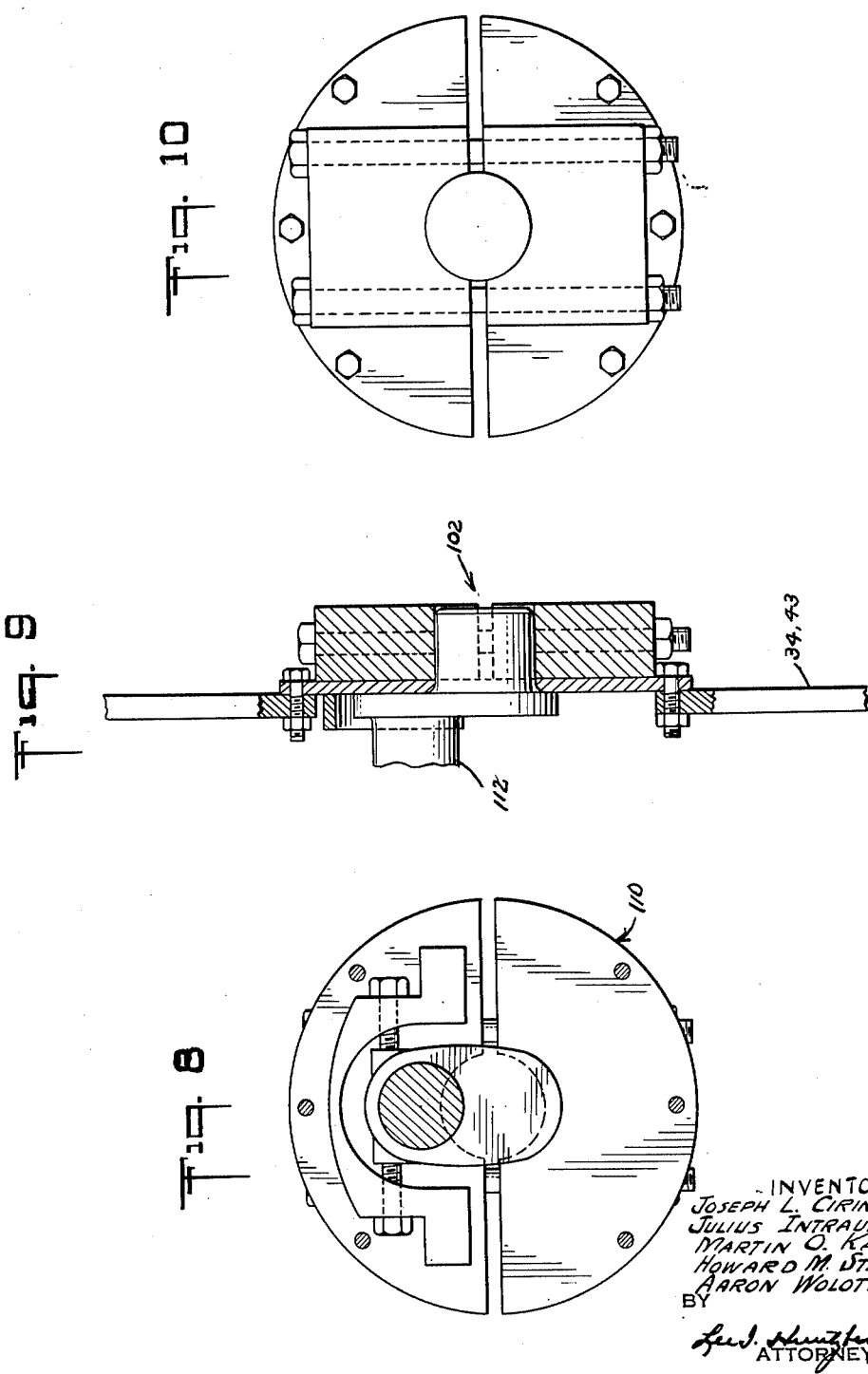

2,836,060

TORSIONAL FATIGUE TESTING APPARATUS

Joseph L. Ciringione, Bellmore, and Julius Intraub, Martin O. Kalb, Howard M. Strobel, and Aaron Wolotkin, New York, N. Y., assignors to the United States of America as represented by the Secretary of the Navy Application December 22, 1954, Serial No. 477,142

17 Claims. (Cl. 73—99)

(Granted under Title 35, U. S. Code (1952), sec. 266)

The invention described herein may be manufactured and used by or for the Government of the United States of America for governmental purposes without the payment of any royalties thereon or therefor.

This invention concerns torsional fatigue testing apparatus including an automatic stress control system, an automatic stress control system adapted to control a plurality of torsional fatigue testing units, a torsional fatigue testing machine, a mechanical variable force exciter, a magnetic reluctance pickup device and a magnetic fluid damping device.

The torsional fatigue testing machine is a two-mass elastic system with the test specimen as the torsional spring element and two discs as the inertial mass. It provides for the application of a torsion force to a test specimen, which may be a crankshaft, for instance, which is securely clamped between two heavy steel inertia discs by a set of grips bolted onto the discs. The assembly is supported on the machine base on a thick layer of sponge rubber which reduces the constraint at the supports. The torsion force is applied to one of the inertia discs, the driving disc, by an unbalanced weight which rotates in a housing affixed to the surface of the driving disc, near its periphery. Part of said housing extends beyond the area of said disc, into free space. The unbalanced weight is rotated by a main drive shaft, driven by a motor, to which it is eccentrically affixed within the housing on the surface of the driving disc. The other inertia disc, or driven disc, to which the other end of the test specimen is clamped, is spring-bolted to the machine base, so that it vibrates at the same amplitude as the driving disc. This is due to the coupling of the driving and driven discs by the rigid test specimen clamped between said discs. In the prior art the location of the weight, that is, the angular position of the eccentrically-attached weight to the main drive shaft, determines the torsion force applied to the disc and hence the stress in the test specimen. Since the shaft rotates continuously, the eccentric weight successively occupies each of the angular positions of space in the plane of the driving disc. Thus, at the instant when the weight is in a position such that it is on a line extending radially outward from the center of the disc and passing through the radial center of the main drive shaft, its influence on the disc is nil, and it exerts no torsion force on the test specimen. However, at every instant that the weight is rotated by the shaft to another angular position in the plane of the disc, it exerts a turning moment (torsion force) on the disc and hence on the test specimen, due to the combined forces acting on it and due to the lever arm distance between the center of gravity of the weight and the radial center of the disc. For every angular position of the main drive shaft's eccentrically affixed weight, except the two positions on the line through the radial center of the shaft and the radial center of the disc, the weight exerts a torsion force on the driving disc; the torsion force applied is a maximum when the weight is positioned on a line perpendicular to the line through the radial center of the shaft and the radial center of the disc and passing through the radial center of the shaft.

At zero degrees position on the line through the radial center of the shaft and the radial center of the disc, the weight exerts a zero torsion force on the disc. As the weight is rotated by the shaft, it exerts a torsion force which increases with the increase of the angle of separation of the weight from said line through the shaft and the disc, until it reaches its maximum value at 90 degrees from said line. As the weight continues to rotate, in the same direction about the shaft, it exerts a decreasing torsion force on the disc until it reaches its 180 degree position, at which instant it is on said line and exerts a zero torsion force on the disc. Continued rotation of the shaft in the same direction positions the weight on the other side of said line through the radial center of the shaft and the radial center of the disc at an angle of greater than 180 degrees; the weight exerting a torsion force in the opposite direction from that of the forces exerted between zero and 180 degrees. The torsion force increases with the increase of the angle of separation of the weight from said line, until it reaches its maximum value at 270 degrees, in its reverse direction. As the weight continues to rotate, in the same direction about the shaft, it exerts a decreasing torsion force on the disc until it reaches its 360 degree, or zero degree position, at which instant it is on said line and exerts a zero torsion force on the disc. Continued rotation of the shaft in the same direction positions the weight on the initial side of said line; the weight exerting a torsion force in its initial direction, opposite from the direction of the forces exerted between 180 and 360 degrees, which gradually increases from zero, at zero degrees, to a maximum at 90 degrees, as the cycle repeats.

Thus, by rotating the shaft and by affixing an eccentric weight to the shaft in a housing affixed to the surface of the disc, the disc, and hence the test specimen, is vibrated by a torsion force which turns it in one direction for half of every cycle of revolution of the shaft and then in the opposite direction for the other half cycle of revolution of the shaft. This is the basis of operation of the torsion fatigue testing machine.

In the present invention the automatic stress control system functions to maintain a constant torsion force on, and hence a constant stress in, a test specimen by adjusting the input force to the torsional fatigue testing machine in relation with any variation of the actual stress in the test specimen from the stress desired therein. The system thereby compensates for changes in the stress amplitude of the test specimen.

The automatic stress control system is a closed-loop system wherein the parameter being controlled, which is the stress in the test specimen, is constantly goverened by the stress itself, as well as by a reference signal, which is a voltage proportional to the stress desired in the test specimen. This is accomplished by an electronic control circuit, which compares a signal proportional to the controlled stress in the test specimen with said reference voltage and produces a resultant error voltage, which is the difference between the two signals. This error voltage, after being amplified, is fed to a mechanical control, which alters the application of the torsion force to the test specimen in such a manner as to reduce the error signal to substantially zero.

The automatic stress control system adapted to control a plurality of torsional fatigue testing units is the automatic stress control with the addition of a stepping switch and an automatic timer, which respectively connect each of a plurality of automatic stress control system circuits with the electronic control circuit and regulate the time that each circuit is allotted to perform its essential compensating function. The stepping switch and timer eliminate the necessity for incorporating the electronic control circuit in each servo loop and permit the use of one electronic control circuit with any number of fatigue testing machines, and their compensating circuits, desired. This system is effective, since stress drift is not appreciable for short periods of time.

The automatic stress control system for maintaining stress control of the test specimen, as described, utilizes an electrical signal, from a mechanical-electrical transducer on the torsional fatigue testing machine, which is proportional to the stress in the test specimen, compares this signal with a reference voltage, produces a difference, or error signal, and utilizes the error signal to actuate a control device which operates to compensate for the error and to reduce it to substantially zero.

The mechanical-electrical transducer may be of any suitable type, including resistance wire gages comprising either potentiometer-connected strain gages or bridge-connected strain gages, or torsional or linear pickups utilizing either seismic principles, piezo-electric effect, or variable magnetic reluctance effect. The mechanical control device, or link between the error signal and the torsional fatigue testing machine, may be of any suitable type, including a mechanical variable force exciter or a magnetic fluid damping device.

It has been found that the stress level in a test specimen subjected to a torsional fatigue test tends to increase throughout its test life. This stress rise is due to the fact that the torsional fatigue testing machines are operated at a force frequency which is below the natural frequency of the mass elastic system. As a result, any decrease in test specimen stiffness results in a decrease in the vibrating system natural frequency. This downward shift, bringing natural and applied frequencies into closer proximity, manifests itself in an increase in the amplitude of vibration of the mass elastic system and consequently an increase in torsional stress applied to the test specimen. To offset this increase, and to maintain a constant stress level, the mechanical control reorients the main and compensating weights in such direction as to result in a lower applied force. During the course of the test this compensation continues until a crack develops and the stiffness of the test specimen becomes so low that the range of correction afforded by the mechanical control is not sufficient to maintain the preselected stress. At this time the test is terminated.

A preferred embodiment of this invention utilizes the mechanical variable force exciter, which is a device which translates the electrical error voltage energy positioned servo motor, representing the amount by which the stress in the test specimen varies from the stress desired in the test specimen, into mechanical energy for controlling the fatigue testing machine in such a manner as to substantially elimante the difference between said stresses.

The corrective torsional force is applied through a weight eccentrically affixed to a compensating shaft, at the same point on the compensating shaft, within the driving disc housing, as the weight on the main drive shaft. The driving disc housing houses the weights on both the main drive shaft and the compensating shaft; the compensating shaft's eccentrically affixed weight being positioned beyond the peripheral boundary of said disc but coplanar therewith and being rotated at the same speed as the other weight. The weights on both said shafts function to vibrate said disc in accordance with their positions relative to the line through the radial center of the disc and the shaft's radial center, as discussed above. Since both weights are in operative relation to the driving disc, they cooperate to produce an overall resultant force which determines the amount and direction of torsion force applied to said disc, and hence the stress in the test specimen.

The mechanical variable force exciter adjusts the angle between said weights to produce a resultant torsion force on the driving disc, which is that necessary to obtain the desired stress in the test specimen, at all times during the torsional fatigue testing of said test specimen. The weights are initially positioned to produce the desired torsion force on the driving disc, so that as their angular positions with relation to each other are varied, said torsion force is varied in proportion (and in direction, if the angular difference between said weights is made great enough).

When the input signal is a fixed, preset value or reference, the servo system is called an automatic regulator or servo-regulator. The control is used in this fashion, although it is possible to vary the reference voltage as a square wave, triangular wave or sine wave, if this type of control is desired.

Another embodiment of this invention utilizes the magnetic fluid damper as the mechanical control device. The magnetic fluid damper utilizes the principle of the magnetic fluid clutch designed by the Bureau of Standards, except that it is here applied to reciprocating motion rather than rotary motion as in the clutch. The damper device is basically a rectangularly-shaped dashpot, containing a fluid mixture of ferrous particles and oil, or a dry mixture of graphite and iron powder, with two parallel surfaces forming the faces of an electromagnet. The dashpot piston is a plate, or paddle, constrained to reciprocate in the fluid, and affixed to the driving disc of the torsional fatigue testing machine. The dashpot housing is affixed to the base of the machine. The electromagnet is energized by the error signal to apply a magnetic field to the fluid which produces damping of the driving disc in proportion to the error signal.

A preferred embodiment of this invention utilizes a magnetic reluctance pickup device as the mechanical-electrical transducer. The magnetic reluctance pickup device comprises a soft iron plate connected to the driven disc of the torsional fatigue testing machine and a stable permanent magnet and coil connected to the driving disc of said machine, for generating a signal at the operating frequency of the system. The magnitude of the signal generated by the magnetic reluctance pickup device varies in accohdance with variations in the amplitude of vibration of said discs, thus being proportional to the stress in the test specimen.

The principal object of this invention is the provision of an automatic control system which automatically maintains a constant applied stress in a selected body, or specimen.

Another object of this invention is the provision of an automatic control system which maintains a constant applied stress in a plurality of selected bodies, or specimens, in a minimum of time.

Another object of this invention is the provision of an automatic control system, as described, which compensates automatically for any variations in the stiffness of a selected specimen, any variations in the force applied to a selected specimen, or any variations in the inertia force applied to a selected specimen.

Another object of this invention is the provision of an automatic control system, as described, which automatically maintains a constant applied stress in a selected specimen to a close tolerance, economically and efficiently.

Another object of this invention is the provision of new and improved torsional fatigue testing apparatus.

Another object of this invention is the provision of a new and improved mechanical control device for force translation and control.

Another object of this invention is the provision of a new and improved mechanical control device for force translation and control, which is of relatively simple configuration and enhanced efficiency of operation.

Another object of this invention is the provision of a new and improved mechanical-electrical transducer device, which functions in accordance with the principles of magnetic reluctance.

A further object of this invention is the provision of a new and improved mechanical-electrical transducer device, which is of relatively simple configuration and of greater operational endurance and efficiency than similar devices of the prior art.

Still a further object of this invention is the provision of a new and improved magnetic damping device of relatively simple configuration and enhanced operating efficiency, which is responsive and free of lag due to residual magnetism.

Other objects and many of the attendant advantages of this invention will be readily appreciated as the same becomes better understood by reference to the following detailed description when considered in connection with the accompanying drawings wherein:

Fig. 6 is the magnetic reluctance pickup device of the present invention;

Fig. 7 is a perspective view of the apparatus showing the mechanical relationship of the test specimen to the remainder of the apparatus; and Figs. 8–10 are sectional and end views of means securing the test specimen in the disks of the apparatus. In Fig. 9, for simplicity, the crankshaft is shown terminating in the grip rather than extending beyond as in Fig. 7.

Figure 1:
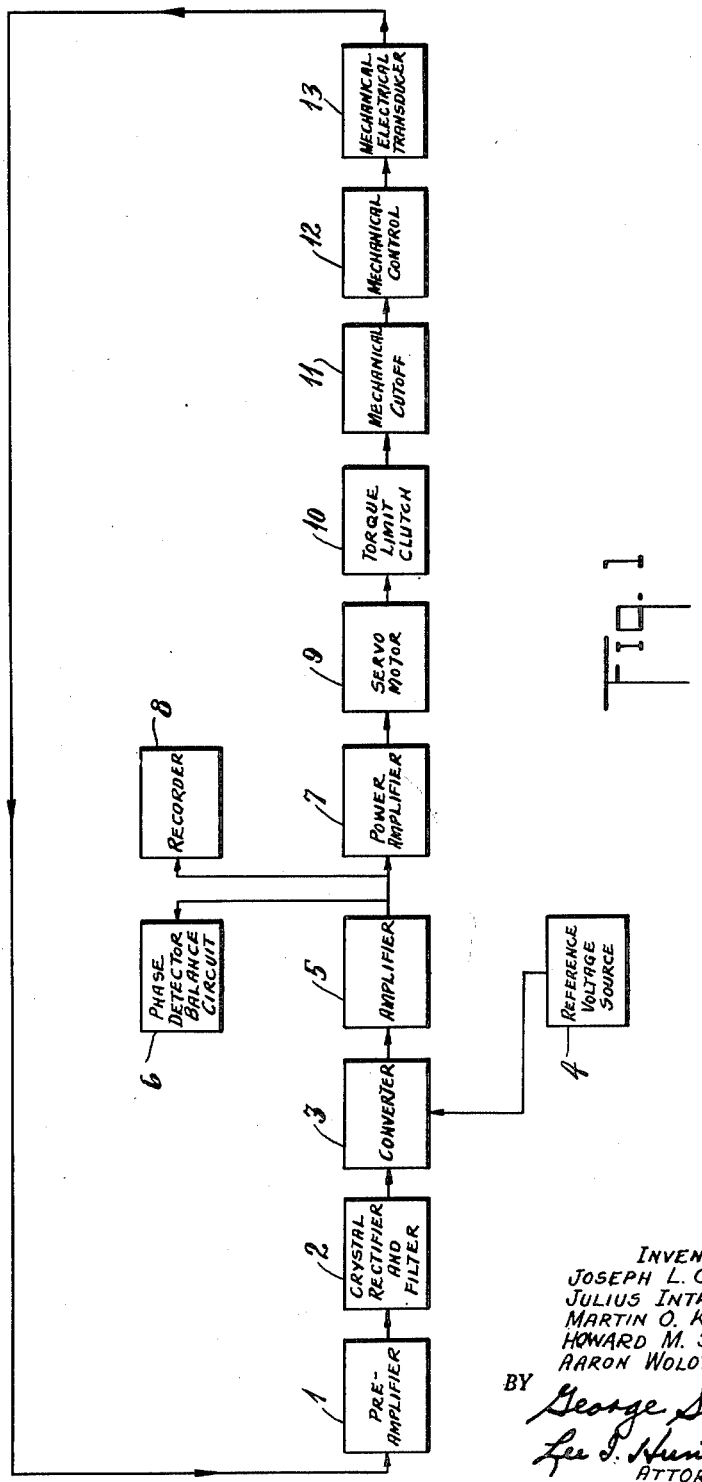
Fig. 1 is the automatic stress control system of the present invention, in block diagram form.

The torsional fatigue testing machine 100 (Fig. 7) of this invention is a two-mass elastic system. The test specimen in the machine 100 is a crankshaft 102; devices other than crankshafts which in use are subjected to varying torsional force may be substituted for the crankshaft and tested by this machine. The crankshaft 102 is mounted on vertical supports 104 and 106 above the base 108 of the machine. Two disks 34 and 43 are secured in spaced relationship on the crankshaft by means of crankshaft grips 110 (Figs. 8, 9, and 10) that are bolted onto each of the disks. The two disks 34 and 43 are the inertial masses of the elastic system. The section 112 of the crankshaft between the disks is the torsional spring element of the elastic system. The assembly of two disks and crankshaft forming the two-mass elastic system is subjected to alternating torsional force for producing torsional vibration. The assembly is supported on the machine base on a layer of sponge rubber (not shown) which reduces the constraint at the supports.

The alternating torsion force is applied to one of the inertia disks, the driving disk 34. The alternating torsion force is obtained from a motor 17; motor 17 drives a main drive shaft 18 (shown in greater detail in Fig. 3). An eccentric weight 32 is secured to the end of rotatable shaft 18. A housing 114 is secured to disk 34 and extends beyond the periphery of the disk. The housing 114 has bearings 116 for the end of shaft 18. Rotation of eccentric weight 32 results in application of an alternating torsional force to the crankshaft section 112 by way of bearings 116 and disk 34. The inertia disk 43 is engaged by an adjustable damping means 118 mounted on base 108.

The instantaneous amplitude and direction of the torsion force that is applied to the test specimen 102 by the weight 32 eccentrically mounted on shaft 18 via the bearings 116 and disk 34 is directly related to angular posiiton of the weight 32 about the axis of shaft 18. The shaft 18 and weight 32 are rotated continuously by the motor 17. When the weight 32 passes through the two angular positions where it is directed radially of the disk 34, it exerts no torsion force on the test specimen. When the weight 32 passes through the two angular positions ninety degrees from the above-mentioned radial positions of weight 32, the weight 32 exerts maximum torsion force. For any angular position of the weight 32, the amplitude of the torsion force exerted thereby is proportional to the distance between a line extending through the center of gravity of the weight and center of rotation of the weight and a line perpendicular thereto extending through the axis of the disk. The torsion force applied to the test specimen via the bearings 116 and disk 34 varies substantially sinusoidally with time whereby there is set up a corresponding torsional vibration in the test specimen.

The alternating torsional force produces an alternating torsional vibration or twist. The amplitude of the twist is continuously sensed by a reluctance pickup 44—49 (Fig. 6) secured to the inertia disks 34 and 43.

Fig. 1 is the automatic stress control system of the present invention, in block diagram form. In Fig. 1, as in Fig. 2, an electrical signal corresponding to the stress in the test specimen is produced by the unit 13 which is the mechanical-electrical transducer on the test specimen, and which may be a strain gage bridge, a magnetic reluctance pickup, or other suitable mechanical-electrical transducer. This signal is applied to the electronic control unit which comprises the units 1, 2, 3, 4, 5, and 6; which units operate as a preamplifier 1, a crystal rectifier and filter 2, a converter 3, a reference voltage source 4, an amplifier 5, and a phase detector balance circuit 6. These units are electronic circuits, designed in a manner known in the prior art, to perform their stipulated functions.

The electrical signal corresponding to the stress in the test specimen, is produced by the mechanical-electrical transducer amplified by the preamplifier unit 1, rectified by the crystal rectifier and filter unit 2 and is compared with the D. C. reference signal from the reference voltage source 4, which represents the stress desired in the test specimen. The unit 3 compares the signal from the mechanical-electrical transducer 13 with the reference source signal and produces a D. C. error signal, which is the difference between said signals. The D. C. error signal is then converted to an alternating voltage, by unit 3, which is proportional to the difference between the stress, as applied, in the test specimen and the stress desired in the test specimen. The unit 5 amplifies the voltage magnitude of the error signal, and the unit 7 amplifies the power sufficiently to drive a two-phase servomotor 9, which operates a mechanical control, located on the base of the torsional fatigue testing machine to substantially eliminate the error signal by varying the force applied to the test specimen. Thus, the electronic control unit output is fed to the power amplifier 7 which drives the servomotor 9 to control the mechanical control unit 12 through a torque limit clutch unit 10 and a position indicator output and cutoff unit 11. The mechanical control unit 12 may be a mechanical variable force exciter, a magnetic fluid damper, or other suitable mechanical control device.

The unit 6 is a phase detector balance circuit which affects a precise balance between the mechanical-electrical transducer's rectified signal and the reference voltage for a balance indication. The unit 8 is a recorder which produces a running record of the error signal. The torque limit clutch unit 10 operates as a mechanical fuse to disconnect the servo motor from the mechanical control device. The unit 11 functions as a mechanical cutoff when the error signal is too great and as a position indicator for the mechanical control device.

Power supplies, necessary for the electronic equipment, are provided, but not shown in the figure.

The automatic stress control system of Fig. 1 has the long-term stability which is an inherent advantage of similar closed-loop systems. The stability results from the fact that the change in the characteristic of most of the components used between the error signal producing circuit and the test specimen does not affect the stress, but only slightly alters the speed of response, which in the present application is of relatively minor importance; the principal purpose being to maintain a constant stress in the test specimen. In addition to the advantage of long term stability, the closed-loop system also affords control of stress to closer tolerances, since changes in parameters, such as shaft stiffness, are included in the information feedback controlling process.

A change in value of any of the components between the mechanical-electrical transducer pickup 13 and the electronic control circuit resulting in a variation of the D. C. signal level to the converter unit 3, however, is of grave importance. This is due to the fact that the control units cannot distinguish such a variation from a change in signal level due to a test specimen stress level variation. The ideal solution is to reduce the number of these components to zero. Since this is not possible, it is necessary to make the components, consisting of the magnetic reluctance pickup, which is the preferred form of mechanical-electrical transducer, the preamplifier 1, and the rectifier and filter 2, extremely stable.

The stability of the magnetic reluctance pickup 13 is dependent mainly upon the invariance of the bar magnet used in setting up the field. Special properly aged magnets are utilized, and shielded cable, to minimize pickup from stray fields, is used. The stability of the preamplifier 1, or its invariance with respect to gain or increase of output due to pckup, is insured through the use of precision wire-wound resistors throughout; a highly regulated plate supply, properly aged tubes, negative feedback, D. C. operated filaments and shielded leads are utilized. The stability of the rectifier 2 depends upon maintaining constant the D. C. output for a given A. C. input, so a germanium diode bridge rectifier consisting of four matched diodes, hermetically sealed, is utilized, in preference to thermionic tubes. This eliminates the need for cathode heaters and reduces hum, pickup, and fluctuation of rectifier efficiency resulting from changes in heater current. The input to the diode bridge is set at a level resulting in efficient operation, in a linear region of the transfer characteristic; this level is kept constant. Selection of a fixed level eliminates the change of rectifier efficiency due to operation at different voltage levels. Non-inductive wire wound resistors are used in the filter 2, in preference to inductors, in order to minimize pickup. The D. C. signal at the filter output corresponds in amplitude to the output of the magnetic reluctance pickup 13 and thus to the stress in the test specimen.

The D. C. signal from the rectifier and filter 2 is compared, by means of the converter 3, and an electrostatically shielded transformer, to the reference voltage signal. The error signal output of the converter 3, at the transformer secondary, is either zero, at system balance, or a square wave of power line frequency which is in or out of phase depending upon whether the rectified bridge output signal of unit 2 is higher or lower than the reference voltage signal. This determines whether the stress level in the test specimen is higher or lower than the desired stress level. The error signal is amplified by unit 5 and the higher mode frequencies (due to the square wave) are suppressed by means of two parallel-T negative feedback networks having a rejection frequency of 60 cycles. The amplifier 5 is thus given a narrow bandwidth whose center is 60 cycles, which, in addition to converting the square wave error signal to a sine wave, also reduces the noise inherent to high gain amplifiers. Also, by decreasing the gain at frequencies remote from 60 cycles the possibility of high frequency oscillation is greatly reduced. Low frequency oscillation, known as motorboating, on the other hand, is prevented by a highly regulated power supply, with its inherently low output impedance, and through the utilization of a separate power supply for the stages of voltage and power amplification in the power amplifier unit 7. The error signal is then fed, by means of two cathode followers as buffers, to the amplifier unit and to a D. C. recording voltmeter after detection and filtering.

The recorder 8 gives a running record of the error signal. Since only an amplitude detector is used, the envelope of the error signal is recorded as a curve showing only the magnitude, and not whether the error is positive or negative. The function of the amplifier unit 7 is to further amplify the error signal received from the control units, and then to provide the power necessary to drive the servo motor 9. The plate voltage for this unit is regulated and plate decoupling filters are utilized to prevent possible motorboating.

A reference power supply provides the reference voltage which serves as a standard for comparison with the rectified and filtered signal voltage from the test specimen mechanical-electrical transducer. Any drift in the reference voltage, whether it occurs in an interval as short as a second or as long as a week, will have a proportional effect upon the accuracy of the control affected by the system of this invention. Power line ripple (60 cycles), if present in the reference voltage in appreciable quantity, would beat with the ripple in the filtered transducer signal voltage (approximately 58 cycles), causing a variation of approximately 2 cycles per second. This variation would cause the servo motor to oscillate at balance (when the error signal actually should be zero) and would cause the force applied to, and thus the stress in, the test specimen to fluctuate. In addition to providing the reference voltage, the supply is also required to provide a stable plate voltage to the tubes of the preamplifier 1, which are also in a critical position. Wire-wound noninductive resistors, for low noise, are utilized at critical points and shielded cabling is used to reduce the hum pickup. A balanced equating circuit in the power supply serves to amplify and compare the output of series-connected thermionic tubes with a voltage regulator tube. The voltage difference is amplified and then fed back to the series-connected tubes in such a phase as to alter their resistance, thereby counteracting any change in the power input. The output of the series-connected tubes, after being acted upon by one regulator stage, is then fed to a second similar regulator stage comprising the remaining control tubes in the power supply. The measured power supply ripple is found to be less than 100 microvolts.

Figure 2:
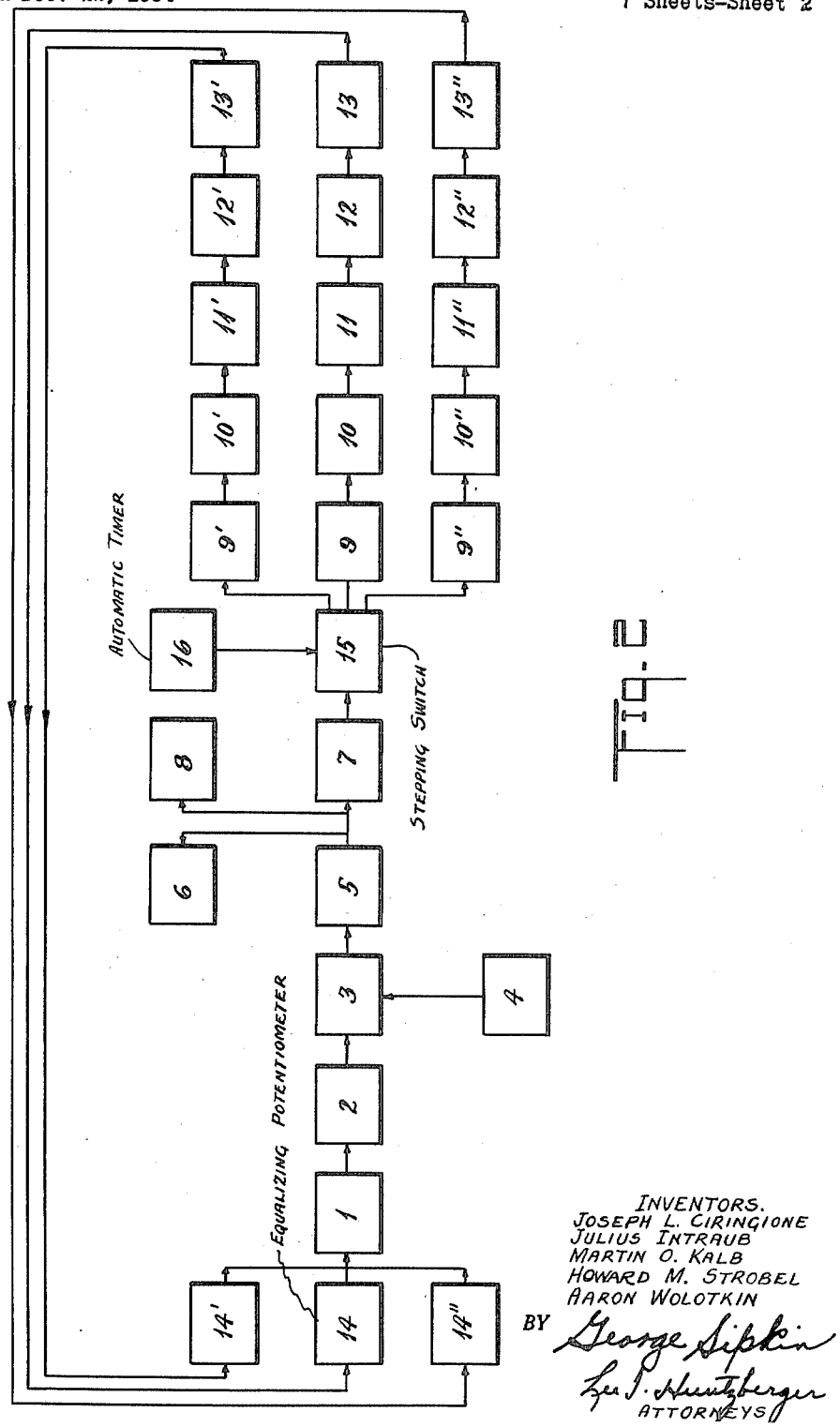
Fig. 2 is the automatic stress control system of the present invention adapted to control a plurality of torsional fatigue testing machines, in block diagram form.

Fig. 2 is the automatic stress control system of the present invention adapted to control a plurality of torsional fatigue testing machines, in block diagram form.

The system of Fig. 2 utilizes all the units shown in Fig. 1, as well as the additional units 14, 15 and 16. The function of the units 1 to 13, inclusive, is the same as that in the system of Fig. 1 and is described in connection with Fig. 1. In Fig. 2, the units 9 to 13, inclusive, as well as 14, are repeated as many times as there are torsional fatigue testing machines to be controlled in the system. The lines connecting the units 9 to 13, inclusive, 13 to 14 and 15 to 9 are repeated as many times as there are fatigue testing machines to be controlled in the system. Although any number of torsional fatigue testing machines may be controlled in the system of Fig. 2, only three controlled circuits are shown for convenience of illustration.

The signal corresponding to the stress in the test specimen, which is produced by the mechanical-electrical transducer 13, is received by the equalizing potentiometer unit 14, which equalizes, to a fixed value, the voltages appearing from the mechanical-electrical transducer of each torsional fatigue testing machine in the system. The use of a selective sampler, comprising the automatic timer 16 and the stepping switch 15, eliminates the need for maintaining a separate electronic control for each torsional fatigue testing machine. The stepping switch unit 15 connects each of the automatic stress control system circuits in the system with the electronic control circuit, in sequence. The automatic timer unit 16 regulates the time that each such circuit is allotted to perform its essential compensating function via said control circuit. The stepping switch 15 is moved forward one position at the end of each timing period, as determined by the automatic timer 16.

Power supplies, necessary for the electronic equipment, are provided, but not shown in Fig. 2.

The selective sampler unit, indicated as units 15 and 16 in Fig. 2, functions as follows. It samples the signal outputs of each of the torsional fatigue testing machines in the system with an adjustable sampling time of from one second to one minute, and feeds a control voltage to the servo motor 9 of each torsional fatigue testing machine in the system. The selective sampler unit indicates, on a meter on its panel, the angular relation between the main and compensating eccentric driving weights on the machine in the control circuit, hence the relative input force. The selective sampler includes means for bypassing a given channel when that machine is not being operated, thus dividing the unused control time among the other machines. It equalizes the signals from all the torsional fatigue testing machines to a common value by the equalizing potentiometers 14, sends the equalized signal to the electronic control unit, and indicates which machine is being sampled.

A number of channels corresponding to the number of automatic stress control systems in the circuit of Fig. 2 terminate in an equal number of potentiometers 14; the potentiometers provide a means for equalizing, to a fixed value, the voltages appearing from each mechanical-electrical transducer of a torsional fatigue testing machine. This permits the use of a single comparison voltage regardless of the voltage or stress level at each torsional fatigue testing machine.

The output of the electronic control circuit is matched to the proper impedance and isolated from the power supply and is then fed to the selective sampler unit, which applies it to the control winding of the servo motor 9 of the torsional fatigue testing machine connected in the circuit at that instant.

The sampling rate adjustment of the selective sampler permits the selection of the time each fatigue machine will be under surveillance by the master control. This is accomplished by varying a resistor in an RC network. The switch 15, provided in the circuit of each servo system to be controlled by the system of Fig. 2, shorts the resistor in said RC network. This enables the operator to skip any desired channel for the purpose of eliminating the control connection of a torsional fatigue testing machine not in use. Ten indicating lights are provided on the face of the selective sampler to enable visual identification of the machine connected in the circuit. A sampling stop-switch, which halts the cycling and permits manipulation of the equalizing potentiometers, may be included as an additional convenience.

For position indication, a suitably geared potentiometer is connected to the servo motor drive of each torsional fatigue testing machine to be controlled. The potentiometer is connected as a voltage divider and produces a voltage proportional to the angular relationship between the weights on the main drive and compensating shafts of the mechanical variable force exciter of the circuit being controlled. This output voltage is transmitted through the stepping switch 15 to a position indicator meter located on the panel of the selective sampler. The face of said meter, calibrated in degrees, provides for rapid identification of the phase angle between said weights of each machine, and hence the torsion force applied to the test specimen, during its control period. The regulated power supply provides a constant D. C. source to said potentiometer.

Figure 3:
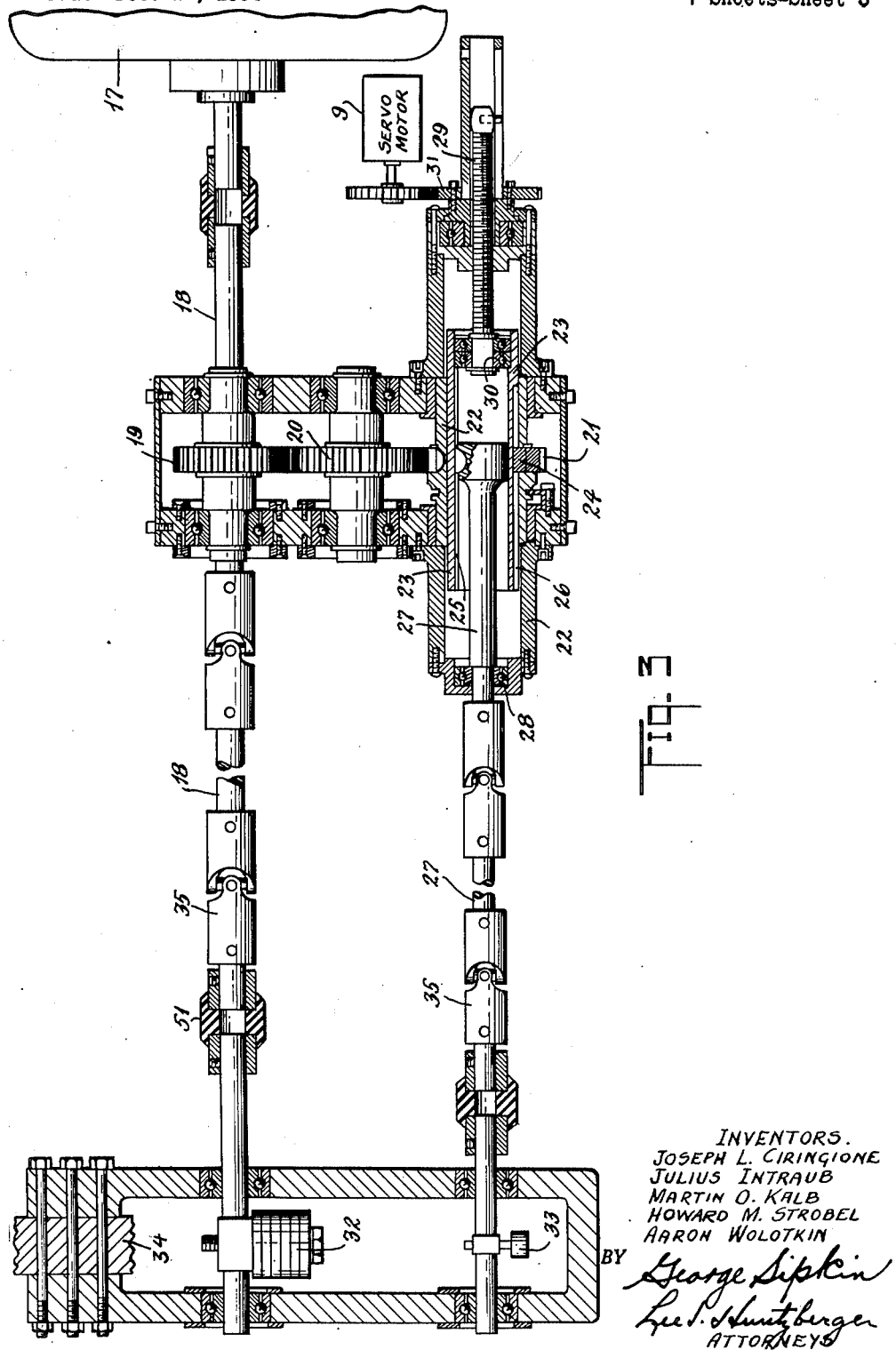
Fig. 3 is the mechanical variable force exciter of the present invention.

Fig. 3 shows a preferred embodiment of the mechanical control unit 12, of Figs. 1 and 2, which is called a mechanical variable force exciter. The mechanical variable force exciter incorporates two basic systems, a drive system and a control system. The drive system comprises two eccentric weights 32 and 33 which are attached to the driving disc 34 of the torsional fatigue testing machine. The main weight 32, which is the larger of these eccentric weights, imparts, on rotation, approximately 80% of the maximum driving force on the driving disc 34 when both weights are operating in phase. The compensating weight 33, which is the smaller of these eccentric weights, may be positioned so as to add to, or subtract from, the resultant disc driving force imparted by the larger weight 32. The mechanical variable force exciter control system functions to change the phase relationship between the compensating weight and the main weight so as to impart a controllable resultant driving force to the driving disc 34 of the torsional fatigue testing machine. The compensating force may vary from 60% to 100% of the maximum driving force that can be applied to the driving disc 34 when both weights are rotating in phase.

The mechanical variable force exciter has a main drive shaft 18, which is driven by a 1½ horsepower three-phase induction motor 17 and a compensating drive shaft 27. The main drive consists of the large three-phase motor 17 driving through a short section of the main drive shaft 18 in the control system and then through a long section of the main drive shaft 18 to the main weight 32. The compensating drive utilizes a power takeoff principle employing 3 meshing gears; a first gear 19 keyed to the main drive shaft 18, a second gear 20 which acts as an idler, and a third gear 21 which is keyed onto a hollow cylinder 22. Fitted into this hollow cylinder 22 is a liner 23, which contains an internal longitudinal slot 25. Keyed in the longitudinal slot 25 is the compensating drive shaft 27. Thus, rotation of the main drive shaft 18, by the motor 17, is transmitted directly to the compensating drive shaft 27 by the gears 19, 20 and 21, and from there to the compensating weight 33.

The phase relationship between the main and compensating weights 32 and 33 may be varied at will by a phase actuating device and its driving element. The liner 23, contains a helical slot 26 which is cut into its outer surface, in addition to the internal longitudinal slot 25 previously mentioned. A helical spline 24 projects from the cylinder 22 and meshes with the helical slot 26 and is the means through which rotation is transmitted from the main drive shaft 18 to the liner 23.

In addition, any longitudinal movement of the liner 23 will result in an additional motion of rotation because the path is described by the pitch of the helix 26 on the liner 23. Thus the liner 23 will rotate relative to the hollow cylinder 22. Since the compensating drive shaft 27 is slotted to the liner 23, but is not free to translate with it, because it is retained by the compensating drive shaft bearing 28, this shaft will rotate with the liner and impart its rotation to the compensating weight 33.

The phase between the main weight 32 and the compensating weight 33 of the torsional fatigue testing machine is changed as follows. The longitudinal motion of the liner 23 is brought about by rotating a threaded shaft called the lead screw 29, through a nut. One end of the shaft 29 is secured to the liner 23 by two thrust bearings 30. The other end is driven by the servo motor 9 pinion gear acting on the gear 31 which meshes with the servo motor pinion gear. In operation, the rotational sense and the number of turns of the lead screw 29 determine the angular phase of the weights, and ultimately the input force on the driving disc 34 of the torsional fatigue testing machine. The servo motor 9 is actuated by the error signal, which is the amount by which the actual (applied) stress in the test specimen should be varied in order to compare with the stress desired in the test specimen. The servo motor 9 positions itself in accordance with its voltage input, which is the error signal, and thus drives the gear 31, through its own pinion gear, to move the lead screw 29 an amount proportional to the position and direction of the servo motor. The amount of motion imparted to the lead screw 29, through the gear 31, by the servo motor, is proportional to the error signal which feeds the servo motor. Upon rotation of the lead screw 29, there is a longitudinal motion of the liner 23, which is affixed to one end of the lead screw 29, directly. The longitudinal motion results from the well known action of a lead screw in rotating, by which it translates an applied torsional force to longitudinal axial motion. Although the compensating drive shaft 27 is rotating at the speed of the main drive shaft 18, due to the direct coupling arrangement of the gears 19, 20 and 21 between the main drive shaft 18 and the compensating drive shaft 27, the motion of correction of the compensating drive shaft 27 is dependent upon the longitudinal displacement of the liner 23. Thus, when the liner 23 moves longitudinally, the meshing helical spline 24 which seats in the helical slot 26, which is in the outer surface of the liner 23, translates the longitudinal motion of the liner 23 into a partial rotational motion. In other words, the compensating drive shaft 27, through its being keyed to the liner 23 by the longitudinal slot 25, is turned in an amount varying from zero to 360 degrees in accordance with the longitudinal motion imparted by the servo motor 9 pinion gear meshing with the gear 31. That is, although the compensating drive shaft 27 is rotating at the speed of the main drive shaft, it is nonetheless, and instantaneously therewith, repositioned rotatably in accordance with a new desired position of the compensating weight 33 eccentrically affixed to said shaft 27 at the driving disc 34.

The universal couplings 35 permit the shafts 18 and 27 to rotate continuously in one direction and yet to be affixed to the driving disc 34, which will rotate first in one direction and then in another direction for the remainder of its cycle; they operate to isolate the vibrational motion of said disc from the other rotating equipment. The rubber couplings 51 operate to isolate the longitudinal motion of said disc from the other rotating equipment.

The main weight 32 and the compensating weight 33 are eccentrically affixed weights to the respective shafts 18 and 27. The weights affixed to the main driving shaft 18 determine the major part of the torsional force applied to the driving disc 34. This force is imparted through the physical principle of movement of inertia; an effect which results from the positioning of the mass at some point on the surface of the driving disc 34 and is dependent upon the radial distance of the mass from the radial center of the disc and the planar position of the mass. There are many forces which act on the weight, in accordance with well-known physical theory, to cause it to rotate the disc first in one direction and then in the opposite direction, merely as a result of its position on the disc and its location from the radial center of the disc. The compensating weight 33 is eccentrically affixed to the compensating drive shaft 27 and acts in the same manner as the main weight 32. That is, the compensating weight 33 may affect the force applied to the main driving disc by the position on the disc and the radial distance from the center of the disc of said compensating weight. Thus, the position of the main weight 32 is usually fixed to drive the driving disc, but the position of the compensating weight 33 is fixed in relation to that of the main weight 32 in order to add to, or subtract from, the resultant torsional force effect of said main weight.

As discussed, in accordance with its angular position, the compensating weight 33 will either have no influence at all on the force applied to the driving disc 34 or it will affect the force applied to said disc either additively, in the same direction with that applied to said disc by the main exciter weight 32, or subtractively, in the opposite direction from that applied by the main weight 32. Thus, the angular positioning of the eccentric weights on both shafts determines whether their physically resulting inertial moments will aid or oppose each other. This permits control of the torsional force applied to the driving disc through the rotational positioning of the compensating weight 33. The rotational positioning of the compensating weight 33 ensues from the aforementioned threading and liner arrangement which is controlled directly by the servo motor 9.

At the beginning of each investigation on a test specimen, each torsional fatigue testing machine should have its main and compensating weights adjusted until a nominal stress of pre-determined value is obtained when the angle between said weights is set at a pre-determined amount (usually about 180 degrees). The phase angle of 180 degrees between the weights is preferable to a 90 degree setting, because the mechanical stop at 180 degrees provides a positive means for establishing the phase relationship of said weights. Of greater importance, however, is the requirement that the torsional stress developed in the test specimen at this setting be sufficiently below the fatigue limit of the test specimen to insure adjustment of the weights without damaging the test specimen.

The mechanical variable force exciter is calibrated by obtaining a fixed range of stress which said exciter must operate through at a given inertia setting of the torsional fatigue testing machine. Calibration of the unit is obtained by fixing the range of stress through which said exciter would operate at a given inertia setting of the torsional fatigue machine. After setting the compensating weight to develop a minimum torsion force, amplitude of motion corresponding to given lead screw turns of the mechanical variable force exciter is recorded. The system response characteristics to a given error signal are obtained by observing and recording the time required for the automatic stress control to respond to a step function corresponding to selected stress values.

The device presently employed to shut down a torsional fatigue testing machine is the mechanical cutoff 11, shown in Figs. 1 and 2, which interrupts the line circuit whenever the resultant force on the compensating weight reaches a maximum or a minimum value. The mechanical cutoff is triggered by a projection on the lead screw 29 of the mechanical variable force exciter. Upon approaching either extremity, this projection closes a snap-action switch which opens circuits to both the main drive motor 17 and the 110 volt line to the two-phase servo motor 9. An indicating light and buzzer are energized at this time to call attention to the fact that the machine has stopped. A by-pass switch is included, which functions to supply 110 volts to the servo motor 9 during the time either of the limit switches is closed by the projection of the lead screw 29. It is used whenever a reverse rotation of the lead screw 29 is required to reposition the compensating weight 33 in the event the fatigue test is terminated for causes other than failure of the test specimen.

Should the electrical stops located in the mechanical cutoff 11 fail to operate, the servo motor 9 will drive the compensating weight of the mechanical variable force exciter until one of the mechanical stops is reached. To insure that further rotation in the same direction will not overload the motor, or harm the mechanical variable force exciter, a torque limit clutch 10 has been provided. The torque limit clutch unit 10, shown in Figs. 1 and 2, acts as a mechanical fuse. It is an outer housing and an inner shaft; rotation being transmitted from the shaft to the housing, or vice versa, through small steel balls, which lie between the mating surfaces. Depressions on the inner shaft, and holes located in the housing, position these transmitting elements around the periphery. The steel balls are pressed into their seats on the inner shaft by flat springs located on the outer housing. During normal running conditions, the steel balls transmit all the torque from the shaft to the housing, or vice-versa. Under heavy demands, the torque developed rises to a point where the transmitting elements overcome the applied spring tension and slip over the indentations, or seats, of the inner shaft. The spring tension, which limits the maximum operating torque that can be developed between the inner shaft and the outer housing, may be adjusted and locked by means of the spring adjusting collar. The torque limit clutch is that disclosed in pending application Serial No. 351,065, filed April 24, 1953, now Patent No. 2,773,370.

Figure 4:
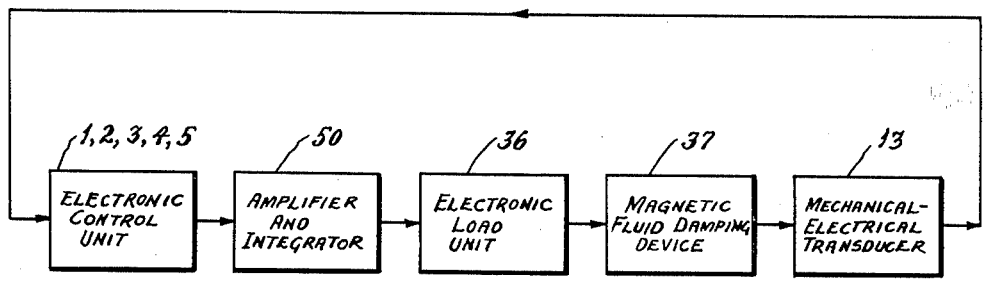
Fig. 4 is the automatic stress control system of the present invention utilizing the magnetic fluid damping device of the present invention, in block diagram form.
Figure 5:
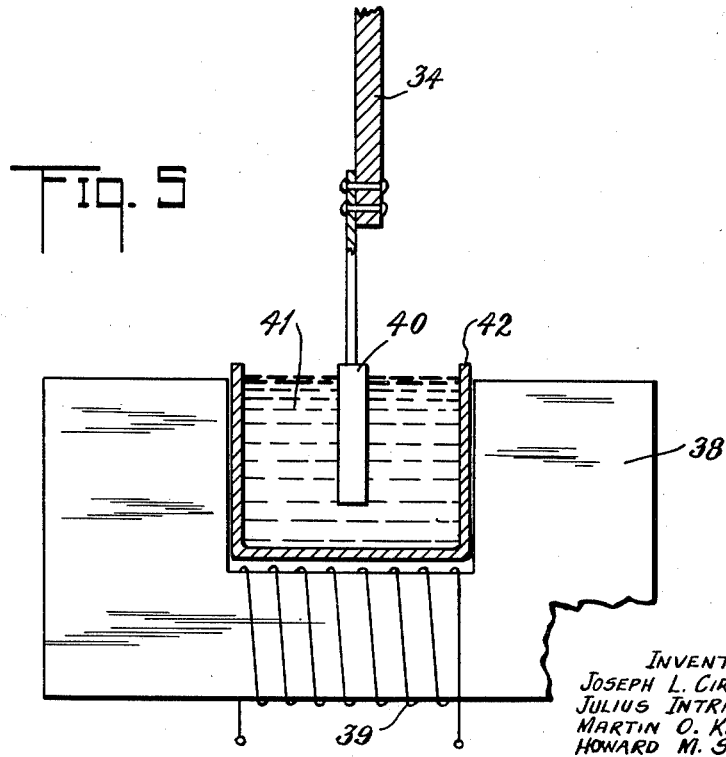
Fig. 5 is the magnetic fluid damping device of the present invention.

Fig. 4 is an automatic stress control system, utilizing the magnetic fluid damping device of the present invention as the mechanical control unit, in block diagram form. The system of Fig. 4 utilizes a magnetic fluid damping device 37, which is also shown in Fig. 5, as the mechanical control unit 12 of the systems of Figs. 1 and 2. The system of Fig. 4 functions, in a manner similar to that of Fig. 1, to maintain a constant stress in the test specimen.

The amplitude of oscillation in the torsional vibration system is controlled by means of the system damping. The magnetic fluid damper, an element of which is firmly affixed to the driving disc of the torsional fatigue testing machine, has its frame fixed to the supporting bed of said machine. By varying the current in the field coil of the magnetic fluid damper, the resistance to motion of the driving disc can be varied and electromagnetic braking action achieved.

Four active resistance wire strain gages attached to the test specimen operate as the mechanical-electrical transducer unit 13 to produce a signal corresponding to the stress in the test specimen. The gages are connected in a conventional bridge circuit. Balancing circuits for the strain gage bridge are situated in the electronic control unit, which comprises the units 1, 2, 3, 5, and 6 indicated in Figs. 1, and 2. The electronic control unit also contains a reference voltage source 4, as shown in Figs. 1 and 2, which, for any given preset value, corresponds to presetting the input signal. This voltage is controllable and can be set to any desired value within the operating range of the equipment. The reference voltage is D. C. and is derived from the reference voltage source 4. In the electronic control unit the strain gage signal is rectified and fed to a converter circuit together with the D. C. reference signal. The resultant error signal is then fed to the amplifier and integrator unit 50 which functions to amplify the error signal and apply it to a motor which, in turn, is geared to a precision potentiometer. The motor-potentiometer combination acts as an integrator. The integrating action is necessitated by the fact that as the system characteristics change, the damping must be changed in order to maintain the stress constant.

The potentiometer is connected to a negative voltage power supply, the slide of the potentiometer being in turn connected to the grids of several power tubes in parallel. The field coil of the magnetic fluid damper is tied in series with the parallel combination of power tubes. Hence, by varying the grid bias of the power tubes the field current of the damper can be controlled and therefore the system damping is controlled in response to the error signal.

The electronic load unit 36 contains four current amplifiers in parallel, which control the current to the magnetic fluid damper coil. Also, overload and underload relays are included, which automatically shut off the operation of the system when the test specimen fails (overload) or when a tube failure causes the current to drop below a pre-determined value.

Power supplies, necessary for the electronic equipment, are provided, but not shown in Fig. 4.

Fig. 5 is the magnetic fluid damping device of the present invention, which may be utilized as the mechanical control unit of Figs. 1, 2 and 4. The large electromagnet 38, which may have pole pieces approximately square in cross-section, is affixed to the base of the torsional fatigue testing machine. When a current, proportional to the error signal, flows through the electromagnet exciting winding 39 the electromagnet 38 produces a strong magnetic fluid through the fluid 41 in the fluid container 42. The fluid 41 comprises iron filings and oil. The steel paddle, or plate, 40, is firmly affixed to the driving disc 34 in such a manner that it moves freely through the fluid 41 in the magnetic field set up in said fluid. Since the field strength of the magnetic field is varied due to the excitation of the electromagnet 38 by the error signal current, the magnetic field resistance to the motion of the paddle, and hence the damping of the motion of the driving disc 34 varies with the error signal. Thus, the damping device operates as a magnetic brake to maintain a constant stress in the test specimen by maintaining a constant applied force on the driving disc 34, and hence on the test specimen, of the torsional fatigue testing machine.

Fig. 6 is the magnetic reluctance pickup device of the present invention, which is the preferred embodiment of the mechanical-electrical transducer unit of Figs. 1 and 2. Basically, the magnetic reluctance pickup is a velocity pickup since its voltage is proportional to the vibration velocity of the discs of the torsional fatigue testing machine. However, since the vibration frequency is essentially constant, the relative displacement of the discs varies directly with the velocity of vibration. This results in an output voltage which is proportional to the displacement amplitude of the oscillating discs.

The pickup consists of a permanent magnet 48 which serves as a core to a coil 46 consisting of several thousand turns of wire. This assembly is housed in a soft iron housing 49 in such a fashion as to present a closed magnetic path at one end and an open path at the other due to a non-magnetic cover 45. A soft iron plate 44 is placed near the open end of the assembly and at a distance from the nonmagnetic cover 45 of the pickup. The resultant flux path, assuming little leakage, is from the permanent magnet 48, across the air-gap between said magnet and the soft iron plate 44, and back to said magnet via the housing 49.

Any relative motion between the housing 49 of the pickup and the plate 44 results in a change of flux density and induces a voltage in the coil 46 to produce a current in the output 47. Since the plate 44 is securely affixed to the driven disc 43 of the torsional fatigue testing machine and the housing 49 is securely affixed to the driving disc 34 of the torsional fatigue testing machine, the current at the output 47 is proportional to the displacement amplitude of the oscillating discs 34 and 43 and is thus proportional to the stress in the test specimen.

Although many embodiments and variations of this invention are apparent, only a few are shown herein. The automatic stress control system may be utilized in any instance where it is desired to monitor the stresses in a body, or specimen.

Stress control of the torsional force applied to the specimen under test may be obtained either by speed control of the driven eccentric weight, inertia control of the driving disc, damping control of the driving disc, or variable force input to the driving disc. Magnetic damping control may not be most desirable, from an economical point of view, in that it functions by converting energy to heat. Speed control of the driving motor is impractical due to the steepness of the resonance curve of the torsional fatigue testing machine. Inertia control of the driving disc does not afford a sufficiently large controllable stress range, within practical engineering limits, to enable an automatic control to function properly.

The advantages of the mechanical variable force exciter, shown in Fig. 3, over the magnetic fluid damping device, indicated in Fig. 5, are as follows. The mechanical variable force exciter requires minor alignment upon changing shafts, whereas the magnetic fluid damping device requires an involved alignment procedure. The rubber coupling of the input drive shaft absorbs small lateral vibrations of the driving disc of the torsional fatigue testing machine, whereas when the magnetic fluid damping device is used the paddle surface is excessively worn by these small lateral vibrations of the driving disc of the torsional fatigue testing machine. The variable force exciter requires but normal maintenance, whereas more frequent attention is required for the addition of silicone fluid to the powdered iron mixture of the magnetic damper. In the utilization of the variable force exciter the torsional force depends upon a given setting of the unbalanced weights and is a definite quantity for each setting, whereas in the utilization of the magnetic fluid damper the damping effect for a given current value depends upon the previous history of the magnet due to its hysteresis. There is no additional electronic equipment required on the variable force exciters utilized, whereas the magnetic damper requires two additional chassis for supplying and controlling current to its coil. The mechanical variable force exciter unit contains its own memory in that it retains the setting made by the control. This is particularly important in the event that the stress control is used in conjunction with the multiunit system, as shown in Fig. 2; the magnetic damper contains no memory, in that when the current is removed the flux decreases to its residual value. For the sequential sampling inherent in the system of Fig. 2, each damper would require its own electronic chassis for supplying current to the coil.

Included among mechanical-electrical transducers, which may be utilized in the present invention for the transformation of mechanical stress in the test specimen into electrical signals, are the strain gage and the magnetic reluctance pickup. The resistance wire strain gage is a commercially available transducer for determining the surface strains in materials subjected to either static of dynamic loads. As applied to the determination of the stress in a specimen being subjected to a cyclic torsional stress in the torsional fatigue testing machine, four strain gages are employed in a conventional bridge circuit form. This type of circuit is utilized because of its large output voltage at a given torsional stress, and additionally, because of its insensitivity to the small bending stresses which co-exist with the torsional stress in the test specimen. The gages are positively affixed to the area whose stress is to be determined and are energized by a doubly regulated D. C. power supply. A bridge circuit is employed in preference to a potentiometer circuit because it offers a better signal-to-noise ratio for a given power supply ripple.

The advantages of the magnetic reluctance pickup, shown in Fig. 6, over the strain gage are as follows. The magnetic pickup is mounted on the discs at the torsional fatigue testing machine, whereas the strain gage is mounted directly on the area whose stress is to be measured. The magnetic pickup is readily mounted and removed, whereas the strain gage requires great precision in mounting and wiring and is impractical to use for more than one test. The magnetic reluctance pickup is stable and requires no external power supply, whereas the strain gage requires a very stable D. C. excitation voltage with a high order of regulation and a low ripple. The magnetic reluctance pickup produces a high level voltage output resulting in fewer stages of amplification and higher signal-to-noise ratio, whereas the strain gage produces a relatively low output voltage requiring a preamplifier. The magnetic pickup requires no moving parts and is of rugged construction, whereas delicate leads from the strain gages may fatigue during long runs.

Obviously many modifications and variations of the present invention are possible in the light of the above teachings. It is therefore to be understood that within the scope of the appended claims the invention may be practiced otherwise than as specifically described.

We claim:

1. An automatic strain control system adapted for use with a machine for testing the torsional fatigue of a test specimen comprising means adapted to be secured to said test specimen for producing an electrical signal proportional to the torsional strain in said specimen, means for producing an electrical reference signal proportional to a predetermined strain, electronic control means electrically connected to the output of said electrical signal means and electrically connected to the output of said reference signal means for receiving, amplifying, rectifying and filtering said electrical signal and then comparing said electrical signal with said reference signal to produce a difference signal therefrom and converting and amplifying said difference signal, means electrically connected to the output of said electronic control means for receiving and amplifying the electrical power of said amplified difference signal, means including a movable element electrically connected to the output of said power amplifying means driven by said power amplified difference signal for converting said power amplified difference signal into a mechanical displacement of said movable element, mechanical control means mechanically coupled to said movable element for controllably adjusting the strain in said test specimen in such manner as to reduce said difference signal to substantially zero, means mechanically coupled to said mechanical control means for interrupting the line circuit when said difference signal reaches a maximum or a minimum value, means mechanically connected in the output of said converting means for disconnecting said converting means from said system upon failure of said line interrupting means to operate when said difference signal reaches a maximum or a minimum value, means electrically connected to the output of said electronic control means for effecting a precise balance between said electrical signal and said reference signal, means electrically connected to the output of said electronic control means for recording the magnitude of said difference signal and means mechanically coupled to said converting means for producing a signal proportional to the relative force applied to said test specimen.

2. An automatic strain control system adapted for use with a plurality of machines for testing the torsional fatigue of a plurality of test specimens comprising means adapted to be secured to each of said test specimens for producing an electrical signal proportional to the torsional strain in each said specimen, a plurality of means electrically connected respectively to the output of each said electrical signal means for equalizing to a common value said electrical signals, means for producing an electrical reference signal proportional to a predetermined strain, electronic control means electrically connected to the output of said electrical signal equalizing means and electrically connected to the output of said reference signal means for receiving, amplifying, rectifying and filtering said electrical signals and then comparing said electrical signals with said reference signal to produce difference signals therefrom and converting and amplifying said difference signals, means electrically connected to the output of said electronic control means for receiving and amplifying the electrical power of said amplified difference signals, means electrically connected to the output of said power amplifying means for selectively switching said power amplified difference signals respectively to each of a plurality of electrical lines in sequence and for regulating the time that each said difference signal is switched to each of said plurality of electrical lines, a plurality of means each including a movable element electrically connected respectively to each of said plurality of electrical lines driven by said switched power amplified difference signals for converting each said switched power amplified difference signal into a mechanical displacement of the respective movable element, a plurality of mechanical control means mechanically coupled respectively to each of said plurality of movable elements for controllably adjusting the strain in each of said plurality of test specimens in such manner as to reduce said difference signals to substantially zero, a plurality of means mechanically coupled respectively to each of said plurality of mechanical control means for interrupting a line circuit when the difference signal in it reaches a maximum or a minimum value, a plurality of means mechanically connected respectively in the output of each of said plurality of converting means for disconnecting each said converting means from its system upon failure of its line interrupting means to operate when the difference signal in it reaches a maximum or a minimum value, means electrically connected to the output of said electronic control means for effecting a precise balance between said electrical signals and said reference signal, means electrically connected to the output of said electronic control means for recording the magnitude of said difference signals and a plurality of means mechanically coupled respectively to each of said plurality of converting means for producing respectively signals proportional to the relative force applied to each of said plurality of test specimens.

3. An automatic strain control system adapted for use with a machine for testing the torsional fatigue of a test specimen comprising means adapted to be secured to said test specimen for producing an electrical signal proportional to the torsional strain in said specimen, means for producing an electrical reference signal proportional to a predetermined strain, electronic control means electrically connected to the output of said electrical signal means and electrically connected to the output of said reference signal means for comparing said electrical signal with said reference signal to produce a difference signal therefrom, means electrically connected to the output of said electronic control means for receiving and amplifying the electrical power of said amplified difference signal, means including a movable element electrically connected to the output of said power amplifying means driven by said power amplified difference signal for converting said power amplified difference signal into a mechanical displacement of said movable element and mechanical control means mechanically coupled to said movable element for controllably adjusting the strain in said test specimen in such manner as to reduce said difference signal to substantially zero.

4. An automatic strain control system adapted for use with a plurality of machines for testing the torsional fatigue of a plurality of test specimens comprising means adapted to be secured to each of said test specimens for producing an electrical signal proportional to the torsional strain in each said specimen, a plurality of means electrically connected respectively to the output of each of said electrical signal means for equalizing to a common value said electrical signals, means for producing an electrical reference signal proportional to a predetermined strain, electronic control means electrically connected to the output of said electrical signal equalizing means and electrically connected to the output of said reference signal means for comparing said electrical signals with said reference signal to produce difference signals therefrom, means electrically connected to the output of said electronic control means for receiving and amplifying the electrical power of said amplified difference signals, means electrically connected to the output of said power amplifying means for selectively switching said power amplified difference signals respectively to each of a plurality of electrical lines in sequence and for regulating the time that each said difference signal is switched to each of said plurality of electrical lines, a plurality of means each including a movable element electrically connected respectively to each of said plurality of electrical lines driven by said switched power amplified difference signals for converting each said switched power amplified difference signal into a mechanical displacement of said movable element and a plurality of mechanical control means mechanically coupled respectively to each of said plurality of movable elements for controllably adjusting the strain in each of said plurality of test specimens in such manner as to reduce said difference signals to substantially zero.

5. An automatic strain control system adapted for use with a machine for testing the torsional fatigue of a test specimen comprising means adapted to be connected to said specimen for producing an electrical signal proportional to the strain in said specimen, means for producing an electrical reference signal proportional to a predetermined strain, electronic control means electrically connected to the output of said electrical signal means and electrically connected to the output of said reference signal means for comparing said electrical signal with said reference signal to produce a difference signal therefrom, means electrically connected to the output of said electronic control means for receiving and amplifying the electrical power of said amplified difference signal, means including a movable element electrically connected to the output of said power amplifying means driven by said power amplified difference signal for converting said power amplified difference signal into a mechanical displacement of said movable element and mechanical control means mechanically coupled to said movable element for controllably adjusting the strain in said test specimen in such manner as to reduce said difference signal to substantially zero comprising a hollow cylinder adapted to be rotated at a predetermined phase and rate of rotation, a liner coaxially positioned within said hollow cylinder and having a helical slot in its outer surface and a longitudinal slot in its inner surface, means affixed to said hollow cylinder cooperating with said helical slot for driving said liner, means for imparting a longitudinal motion to said liner, means coupling said movable element with said longitudinal motion imparting means for positioning said longitudinal motion imparting means in accordance with the position of said movable element and means driven by said liner for applying a torsional force to said test specimen.

6. An automatic strain control system adapted for use with a plurality of machines for testing the torsional fatigue of a plurality of test specimens comprising means adapted to be secured to each of said test specimens for producing an electrical signal proportional to the strain in each said specimen, a plurality of means electrically connected respectively to the output of each of said electrical signal means for equalizing to a common value said electrical signals, means for producing an electrical reference signal proportional to a predetermined strain, electronic control means electrically connected to the output of said electrical signal equalizing means and electrically connected to the output of said reference signal means for comparing said electrical signals with said reference signal to produce difference signals therefrom, means electrically connected to the output of said electronic control means for receiving and amplifying the electrical power of said amplified difference signals, means electrically connected to the output of said power amplifying means for selectively switching said power amplified difference signals respectively to each of a plurality of electrical lines in sequence and for regulating the time that each said difference signal is switched to each of said plurality of electrical lines, a plurality of means each including a movable element electrically connected respectively to each of said plurality of electrical lines driven by said switched power amplified difference signals for converting each said switched power amplified difference signal into a mechanical displacement of the respective movable element and a plurality of mechanical control means mechanically coupled respectively to each of said plurality of movable elements for controllably adjusting the strain in each of said plurality of test specimens in such manner as to reduce said difference signals to substantially zero, each said mechanical control means comprising a hollow cylinder adapted to be rotated at a predetermined phase and rate of rotation, a liner coaxially positioned within said hollow cylinder and having a helical slot in its outer surface and a longitudinal slot in its inner surface, means affixed to said hollow cylinder in registration with said helical slot for driving said liner, means for imparting a longitudinal motion to said liner, means coupling a selected one of said plurality of movable elements with said longitudinal motion imparting means for positioning said longitudinal motion imparting means in accordance with the position of said movable element and means driven by said liner for applying a torsional force to a selected one of said test specimens.

7. In an automatic strain control system adapted for use with a machine for testing the torsional fatigue of a test specimen clamped to the driving disc and to the driven disc of said machine the combination of means adapted to be secured to said disks for producing an electrical signal proportional to the torsional strain in said test specimen comprising a housing of magnetic material affixed to said driving disc, a permanent magnet so positioned within said housing as to produce a magnetic field of predetermined concentration, an electrically conducting coil coaxially positioned about said permanent magnet and having output terminals and a plate of magnetic material affixed to said driven disc positioned in a plane parallel to that of the face of said permanent magnet and separated therefrom by an air gap and means for producing an electrical reference signal proportional to a predetermined strain, electronic control means electrically connected to said output terminals of said electrical signal means and electrically connected to the output of said reference signal means for comparing said electrical signal with said reference signal to produce a difference signal therefrom, means electrically connected to the output of said electronic control means for receiving and amplifying the electrical power of said amplified difference signal, means including a movable element electrically connected to the output of said power amplifying means driven by said power amplified difference signal for converting said power amplified difference signal into a mechanical displacement of said movable element and mechanical control means mechanically coupled to said movable element for cantrollably adjusting the strain in said test specimen in such manner as to reduce said difference signal to substantially zero.

8. In an automatic strain control system adapted for use with a machine for testing the torsional fatigue of a test specimen clamped to the driving disc and to the driven disc of said machine the combination of means adapted to be secured to said disks for producing an electrical signal proportional to the torsional strain in said test specimen comprising a housing of magnetic material affixed to said driving disc, a permanent magnet so positioned within said housing as to produce a magnetic field of predetermined concentration, an electrically conducting coil coaxially positioned about said permanent magnet and having output terminals and a plate of magnetic material affixed to said driven disc positioned in a plane parallel to that of the face of said permanent magnet and separated therefrom by an air gap and means for producing an electrical reference signal proportional to a predetermined strain, electronic control means electrically connected to said output terminals of said electrical signal means and electrically connected to the output of said reference signal means for comparing said electrical signal with said reference signal to produce a difference signal therefrom, means electrically connected to the output of said electronic control means for receiving and amplifying the electrical power of said amplified difference signal, means including a movable element electrically connected to the output of said power amplifying means driven by said power amplified difference signal for converting said power amplified difference signal into a mechanical displacement of said movable element and mechanical control means mechanically coupled to said movable element for controllably adjusting the strain in said test specimen in such manner as to reduce said difference signal to substantially zero, comprising a hollow cylinder adapted to be rotated at a predetermined phase and rate of rotation, a liner coaxially positioned within said hollow cylinder and having a helical slot in its outer surface and a longitudinal slot in its inner surface, means affixed to said hollow cylinder in registration with said helical slot for driving said liner, means for imparting a longitudinal motion to said liner, means coupling said movable element with said longitudinal motion imparting means for positioning said longitudinal motion imparting means in accordance with the position of said movable element and means driven by said liner for applying a torsional force to said driving disc.

9. A mechanical control apparatus adapted to control the torsional force applied to a test specimen clamped between the driving disc and the driven disc of a torsional fatigue testing machine comprising a main drive shaft, means for rotating said main drive shaft, means driven by said main drive shaft for applying a torsional force to said driving disc, a hollow cylinder element, means for rotating said hollow cylinder element at the rate of rotation of said main drive shaft, a liner element coaxially positioned within said hollow cylinder element and having a longitudinal slot in its inner surface, one of said elements having a helical slot in its outer surface, means affixed to the other of said elements and cooperating with said helical slot for rotating said liner at the rate of rotation of said hollow cylinder and for translating any longitudinal motion of said liner to a rotational motion thereof relative to said hollow cylinder, a compensating drive shaft, means affixed to said compensating drive shaft and cooperating with said longitudinal slot for rotating said compensating drive shaft at the rate of rotation of said liner, means driven by said compensating drive shaft for applying a further torsional force to said driving disc, means for converting electrical power into mechanical position, means for imparting a longitudinal motion to said liner, means coupling said mechanical converter with said longitudinal motion imparting means for positioning said longitudinal motion imparting means in accordance with the mechanical position of said mechanical converter, universal coupling means on said main drive shaft and universal coupling means on said compensating drive shaft.

10. A mechanical control apparatus adapted to control the stress in a test specimen undergoing torsional fatigue testing comprising a main drive shaft, means for rotating said main drive shaft, means driven by said main drive shaft for applying a torsional force to said test specimen, a hollow cylinder, means for rotating said hollow cylinder at the rate of rotation of said main drive shaft, a liner coaxially positioned within said hollow cylinder and having a longitudinal slot in its inner surface and a helical slot in its outer surface, means affixed to said hollow cylinder and cooperating with said helical slot for rotating said liner at the rate of rotation of said hollow cylinder and for translating any longitudinal motion of said liner to a rotational motion thereof relative to said hollow cylinder, a compensating drive shaft, means affixed to said compensating drive shaft and cooperating with said longitudinal slot for rotating said compensating drive shaft at the rate of rotation of said liner, means driven by said compensating drive shaft for applying a further torsional force to said test specimen and means for imparting a longitudinal motion to said liner.

11. A mechanical control apparatus adapted to control the stress in a test specimen comprising a main drive shaft, means for rotating said main drive shaft, a hollow cylinder, means for rotating said hollow cylinder at the rate of rotation of said main drive shaft and in phase therewith, a liner coaxially positioned within said hollow cylinder and having a longitudinal slot in its inner surface and a helical slot in its outer surface, means affixed to said hollow cylinder and cooperating with said helical slot for rotating said liner at the rate of rotation of said hollow cylinder and in phase therewith and for translating any longitudinal motion of said liner to a rotational motion thereof relative to said hollow cylinder to alter the phase between said liner and said hollow cylinder, a compensating drive shaft, means affixed to said compensating drive shaft and cooperating with said longitudinal slot for rotating said compensating drive shaft at the rate of rotation of said liner, means for imparting a longitudinal motion to said liner.

12. Mechanical control apparatus comprising a hollow cylinder adapted to be coupled to a driving member so as to be rotated thereby, a liner coaxially positioned within said hollow cylinder and having a longitudinal slot in its inner surface and a helical slot in its outer surface, said liner adapted to be coupled to a rotatable driven member by means of the longitudinal slot therein, means affixed to said hollow cylinder cooperating with said helical slot for rotating said liner at the rate of rotation of said hollow cylinder and in phase therewith and for translating any longitudinal motion of said liner to a rotational motion thereof relative to said hollow cylinder to alter the phase between said liner and said hollow cylinder and means for imparting a longitudinal motion to said liner.

13. Mechanical phase control apparatus comprising a hollow cylinder adapted to be coupled to a driving member so as to be rotated thereby, a liner coaxially positioned within said hollow cylinder and having a helical slot in its outer surface and a longitudinal slot in its inner surface, said liner adapted to be coupled to a rotatable driven member by means of the longitudinal slot therein, a helical spline affixed to said hollow cylinder and cooperating with said helical slot for driving said liner and means for imparting a longitudinal motion to said liner.

14. Mechanical phase control apparatus comprising a hollow cylinder adapted to be coupled to a driving member so as to be rotated thereby, a liner coaxially positioned within said hollow cylinder and having a helical slot in its outer surface, said liner adapted to be coupled to a rotatable driven member, means affixed to said hollow cylinder cooperating with said helical slot for driving said liner and means for imparting a longitudinal motion to said liner.

15. A mechanical control apparatus adapted to control the torsional force applied to a test specimen clamped between the driving disc and the driven disc of a torsional fatigue testing machine comprising a main drive shaft, means for rotating said main drive shaft, means driven by said main drive shaft for applying a torsional force to said driving disc, a hollow cylinder element, means for rotating said hollow cylinder element at the rate of rotation of said main drive shaft, a liner element coaxially positioned within said hollow cylinder element and having a longitudinal slot in its inner surface, one of said elements having a helical slot in its outer surface, means affixed to the other of said elements and cooperating with said helical slot for rotating said liner at the rate of rotation of said hollow cylinder and for translating any longitudinal motion of said liner to a rotational motion thereof relative to said hollow cylinder, a compensating drive shaft, means affixed to said compensating drive shaft and cooperating with said longitudinal slot for rotating said compensating drive shaft at the rate of rotation of said liner, means driven by said compensating drive shaft for applying a further torsional force to said driving disc, means for converting electrical power into mechanical position, means for imparting a longitudinal motion to said liner, means coupling said mechanical converter with said longitudinal motion imparting means for positioning said longitudinal motion imparting means in accordance with the mechanical position of said mechanical converter, shaft coupling means on each shaft for isolating longitudinal motion of said driving disc and shaft coupling means on each shaft for isolating the vibrational motion of said driving disc.

16. In combination with a first body and a second body adapted for oscillatory movement relative to each other, a cylinder of magnetic material secured to said first body, a closure member of magnetic material secured to said cylinder substantially at one end thereof, a cylindrical permanent magnet mounted in said cylinder coaxially therewith whereby one end is engaged with said closure member, an electrical coil in said cylinder and surrounding said magnet, the ends of said coil extending outside of said cylinder, a disk of magnetic material, the transverse dimensions of said disk being substantially equal to the transverse dimensions of said cylinder, means securing said disk to said second body whereby said disk is adjacent to the other end of said cylinder and substantially coaxial therewith and whereby said disk and cylinder move toward and away from each other when said bodies oscillate relative to each other.

17. A combination as defined in claim 16 further including a flat disk of nonmagnetic material secured to said other end of said cylinder.

References Cited in the file of this patent

UNITED STATES PATENTS

| | | |
|---|---|---|
| 1,488,975 | Brown | Apr. 1, 1924 |
| 1,906,065 | Hoffman | Apr. 25, 1933 |
| 2,150,377 | Keinath | Mar. 14, 1939 |
| 2,276,817 | Bango | Mar. 17, 1942 |
| 2,299,081 | Draper | Oct. 20, 1942 |
| 2,316,253 | Keinath | Apr. 13, 1943 |
| 2,404,965 | Kilgore et al. | July 30, 1946 |
| 2,411,450 | Miller et al. | Nov. 19, 1946 |
| 2,411,451 | Demartini et al. | Nov. 19, 1946 |
| 2,535,667 | Burger et al. | Dec. 26, 1950 |
| 2,562,640 | Reason | July 31, 1951 |
| 2,579,632 | Vore et al. | Dec. 25, 1951 |
| 2,613,529 | Katz | Oct. 14, 1952 |
| 2,630,007 | Howe | Mar. 3, 1953 |
| 2,667,237 | Rabinow | Jan. 26, 1954 |
| 2,673,461 | Gibbs | Mar. 30, 1954 |